(12) United States Patent
Horikawa

(10) Patent No.: US 11,394,899 B2
(45) Date of Patent: Jul. 19, 2022

(54) IMAGE PROCESSING APPARATUS, IMAGE CAPTURING APPARATUS, IMAGE PROCESSING METHOD, AND STORAGE MEDIUM FOR GENERATING VIEWPOINT MOVEMENT MOVING IMAGE

(71) Applicant: CANON KABUSHIKI KAISHA, Tokyo (JP)

(72) Inventor: Yohei Horikawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 244 days.

(21) Appl. No.: 16/785,806

(22) Filed: Feb. 10, 2020

(65) Prior Publication Data

US 2020/0260018 A1 Aug. 13, 2020

(30) Foreign Application Priority Data

Feb. 12, 2019 (JP) .............................. JP2019-022945

(51) Int. Cl.
| | |
|---|---|
| *H04N 5/262* | (2006.01) |
| *H04N 5/265* | (2006.01) |
| *G06T 7/70* | (2017.01) |
| *G06T 7/55* | (2017.01) |
| *G06T 7/32* | (2017.01) |
| *H04N 5/232* | (2006.01) |

(52) U.S. Cl.
CPC .............. *H04N 5/265* (2013.01); *G06T 7/32* (2017.01); *G06T 7/55* (2017.01); *G06T 7/70* (2017.01); *H04N 5/23229* (2013.01); *H04N 5/2628* (2013.01); *G06T 2207/20221* (2013.01)

(58) Field of Classification Search
CPC .... G06T 7/55; G06T 7/70; G06T 7/32; G06T 2207/20221; H04N 5/23229; H04N 5/2628; H04N 5/265
USPC ......................................................... 348/239
See application file for complete search history.

(56) References Cited

U.S. PATENT DOCUMENTS

| | | | | |
|---|---|---|---|---|
| 2011/0150101 A1* | 6/2011 | Liu | ...................... | H04N 13/282 375/240.26 |
| 2013/0038606 A1* | 2/2013 | Ushiki | .................. | H04N 13/351 348/46 |
| 2013/0265397 A1* | 10/2013 | Matsuda | ................... | G03C 9/00 348/51 |
| 2017/0310878 A1* | 10/2017 | Mochizuki | .......... | H04N 5/36961 |

FOREIGN PATENT DOCUMENTS

| | | |
|---|---|---|
| JP | 5917125 B2 | 5/2016 |
| JP | 2017-005689 A | 1/2017 |

* cited by examiner

*Primary Examiner* — Usman A Khan
(74) *Attorney, Agent, or Firm* — Cowan, Liebowitz & Latman, P.C.

(57) ABSTRACT

There is provided an image processing apparatus. A generating unit generates a plurality of composite images by repeatedly carrying out a compositing process that composites a plurality of parallax images according to a compositing ratio. The parallax images have parallax with respect to each other. A control unit carries out control so that the compositing ratio changes over time as the compositing process is repeated. A positioning unit positions the plurality of composite images so that a rotational center of viewpoint movement arising between the plurality of composite images due to the change over time in the compositing ratio moves in a depth direction.

11 Claims, 10 Drawing Sheets

FIG. 2
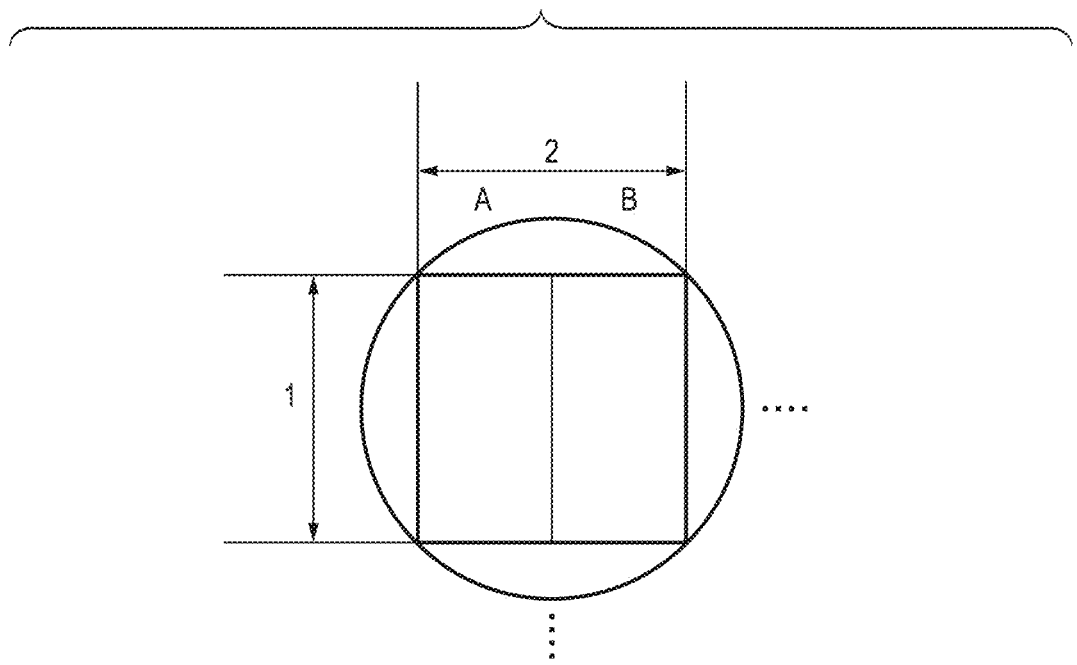
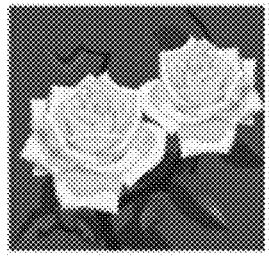
1A
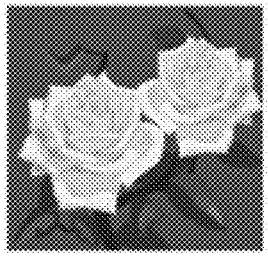
1B
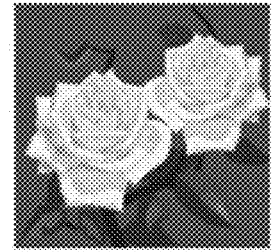

FIG. 3A
FIG. 3B
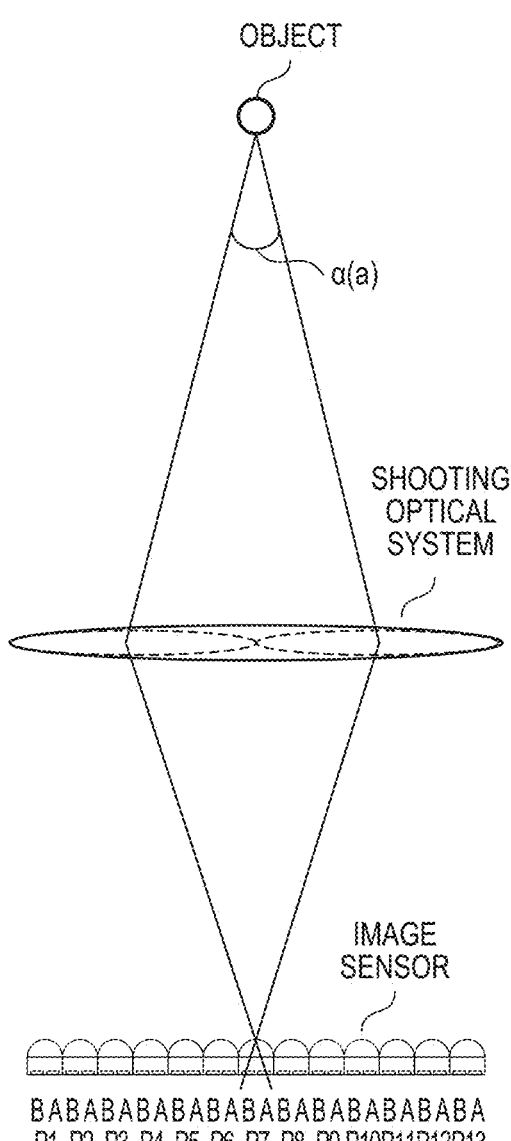
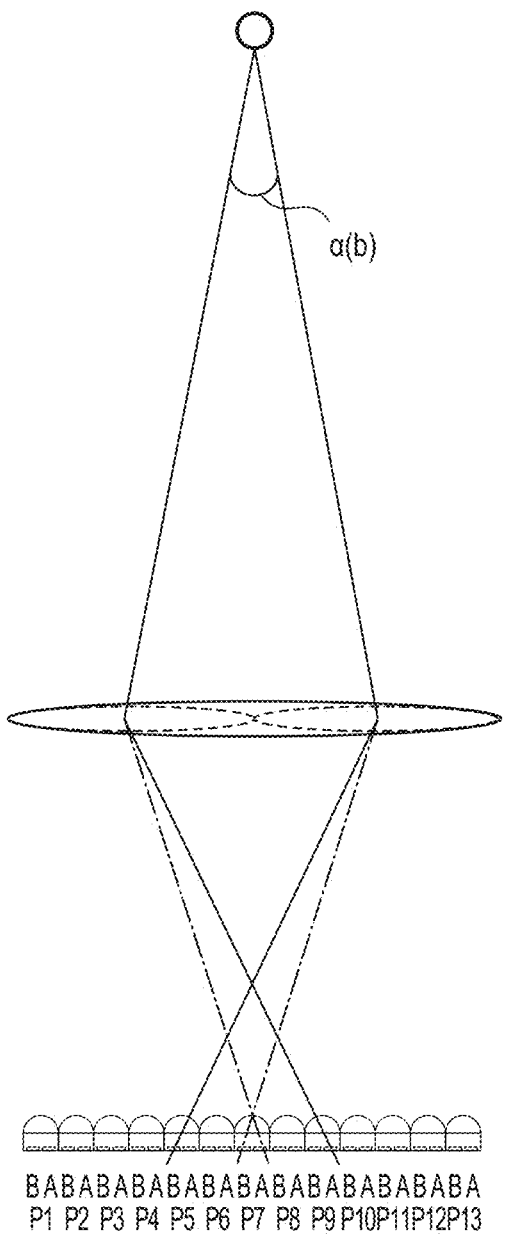
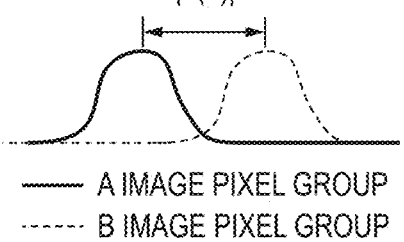

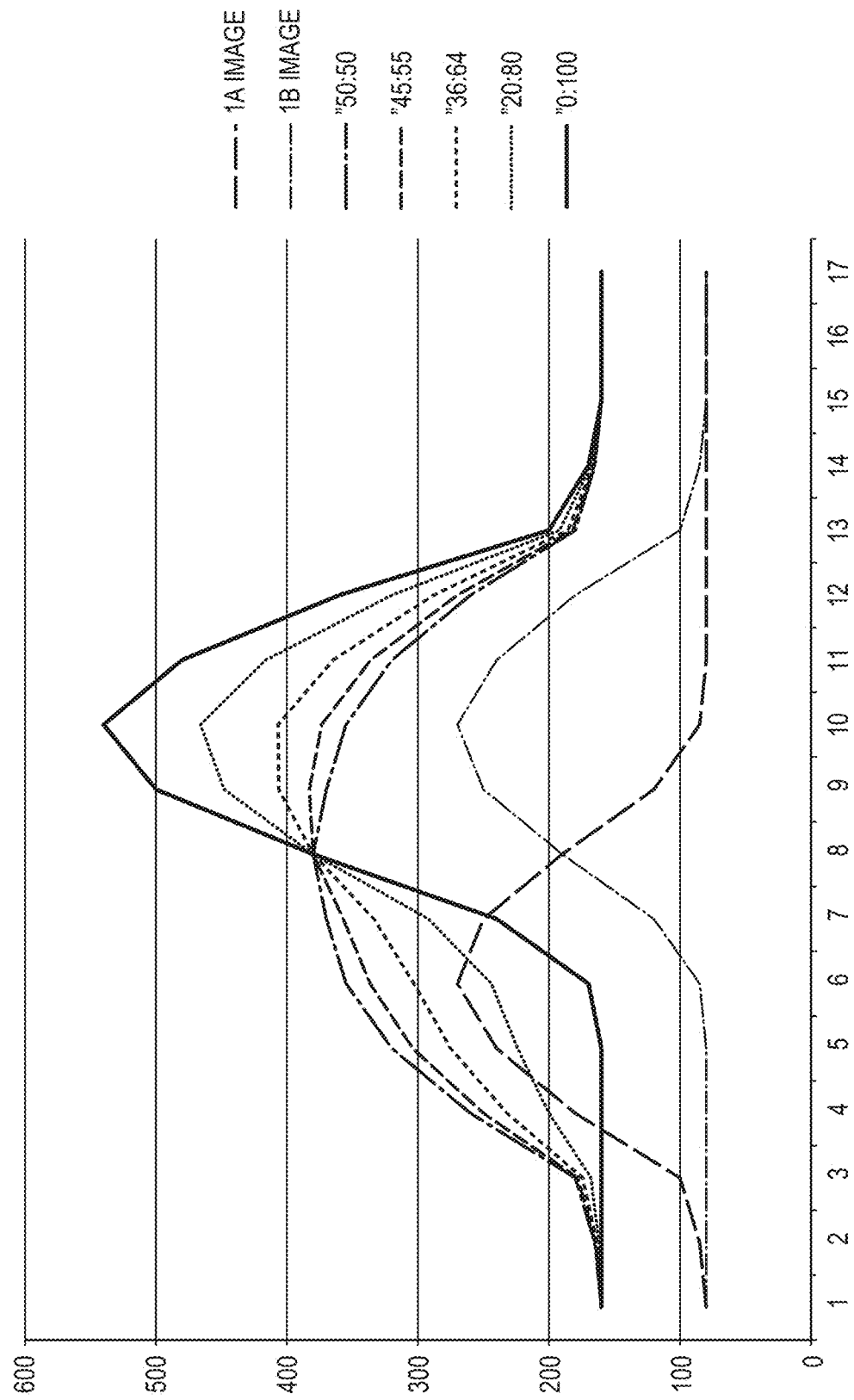

IMAGE PROCESSING APPARATUS, IMAGE CAPTURING APPARATUS, IMAGE PROCESSING METHOD, AND STORAGE MEDIUM FOR GENERATING VIEWPOINT MOVEMENT MOVING IMAGE

BACKGROUND OF THE INVENTION

Field of the Invention

The present invention relates to an image processing apparatus, an image capturing apparatus, an image processing method, and a storage medium.

Description of the Related Art

A method called "dolly shooting" is known as a method for using an image capturing apparatus such as a digital camera to shoot a moving image in which the viewpoint moves in a smooth manner.

Meanwhile, an image capturing apparatus that uses a two-dimensional image sensor, in which a photoelectric conversion unit having a single microlens divided into multiple parts is formed for each pixel, is known (Japanese Patent No. 5917125). The divided photoelectric conversion unit (also called a "divided pixel" hereinafter) is configured so that different partial pupil regions of the exit pupil of a shooting lens receive light through the single microlens, and pupil division is achieved through this configuration. The respective outputs of the pupil-divided photoelectric conversion unit are parallax images corresponding to the partial pupil regions resulting from the division. Repeatedly compositing the parallax images while varying the weighting (compositing ratio) thereof makes it possible to generate a moving image to which is imparted a viewpoint movement effect, with the in-focus plane located on the rotational center of the viewpoint movement.

Additionally, image capturing apparatuses using two-dimensional image sensors are known as plenoptic cameras or light field cameras, and shifting the parallax images in the direction of the parallax makes it possible to carry out refocus processing for moving the in-focus plane after shooting. Japanese Patent Laid-Open No. 2017-5689 discloses a technique in which the rotational center of viewpoint movement in a moving image is changed in the focus direction (the depth direction) by generating the moving image having a viewpoint movement effect after moving the in-focus plane on the basis of a range over which refocusing is possible. Carrying out such processing makes it possible to impart a viewpoint movement effect to a region that was in focus at the time of shooting, to which it has been difficult to add such a viewpoint movement effect thus far.

The baselines between divided pixels are comparatively short in two-dimensional image sensors such as those disclosed in Japanese Patent No. 5917125 and Japanese Patent Laid-Open No. 2017-5689. Thus when a moving image to which a viewpoint movement effect has been added is generated from parallax images obtained from a two-dimensional image sensor, the viewpoint movement effect will be comparatively small. Here, if the moving image having a viewpoint movement effect is generated after moving the in-focus plane as disclosed in Japanese Patent Laid-Open No. 2017-5689, the appearance of a comparatively large viewpoint movement effect can be achieved in the regions of objects that are distant from the in-focus plane after the in-focus plane is moved. However, when the two-dimensional image sensor has a small number of divided pixels, the in-focus plane will only move a small amount when the in-focus plane is moved within the refocusable range, and thus the viewpoint movement effect cannot be increased significantly. Additionally, moving the in-focus plane beyond the refocusable range produces double contours in the image, leading to a drop in image quality. Ultimately, according to the technique of Japanese Patent Laid-Open No. 2017-5689, the in-focus plane remains the rotational center even when the in-focus plane is moved, and thus the range over which the rotational center of the viewpoint movement can be moved is restricted to the range over which the in-focus plane can be moved.

SUMMARY OF THE INVENTION

Having been achieved in light of such circumstances, the present invention provides a technique that makes it possible to generate, from parallax images, a moving image having a viewpoint movement effect in which a position different from the in-focus plane in the depth direction serves as a rotational center.

According to a first aspect of the present invention, there is provided an image processing apparatus comprising at least one processor and/or at least one circuit which functions as: a generating unit configured to generate a plurality of composite images by repeatedly carrying out a compositing process that composites a plurality of parallax images according to a compositing ratio, the parallax images having parallax with respect to each other; a control unit configured to carry out control so that the compositing ratio changes over time as the compositing process is repeated; and a positioning unit configured to position the plurality of composite images so that a rotational center of viewpoint movement arising between the plurality of composite images due to the change over time in the compositing ratio moves in a depth direction.

According to a second aspect of the present invention, there is provided an image processing method executed by an image processing apparatus, comprising: generating a plurality of composite images by repeatedly carrying out a compositing process that composites a plurality of parallax images according to a compositing ratio, the parallax images having parallax with respect to each other; carrying out control so that the compositing ratio changes over time as the compositing process is repeated; and positioning the plurality of composite images so that a rotational center of viewpoint movement arising between the plurality of composite images due to the change over time in the compositing ratio moves in a depth direction.

According to a third aspect of the present invention, there is provided a non-transitory computer-readable storage medium which stores a program for causing a computer to execute an image processing method comprising: generating a plurality of composite images by repeatedly carrying out a compositing process that composites a plurality of parallax images according to a compositing ratio, the parallax images having parallax with respect to each other; carrying out control so that the compositing ratio changes over time as the compositing process is repeated; and positioning the plurality of composite images so that a rotational center of viewpoint movement arising between the plurality of composite images due to the change over time in the compositing ratio moves in a depth direction.

Further features of the present invention will become apparent from the following description of exemplary embodiments with reference to the attached drawings.

BRIEF DESCRIPTION OF THE DRAWINGS

FIG. 2 is a diagram illustrating a unit pixel cell in an image sensor 102.

FIGS. 3A to 3C are diagrams illustrating principles for obtaining parallax images.

FIG. 4 is a diagram illustrating a change in a contour center position of a composite image obtained through a compositing process.

DESCRIPTION OF THE EMBODIMENTS

Embodiments will be described hereinafter in detail, with reference to the accompanying drawings. Note that the following embodiments do not limit the invention as set forth in the scope of patent claims. Although several features are described in the embodiments, all of these features are not necessarily required for the invention, and multiple features may be combined as desired. Furthermore, in the accompanying drawings, the same or similar configurations are given the same reference signs, and redundant descriptions thereof will be omitted.

First Embodiment

Figure 1:
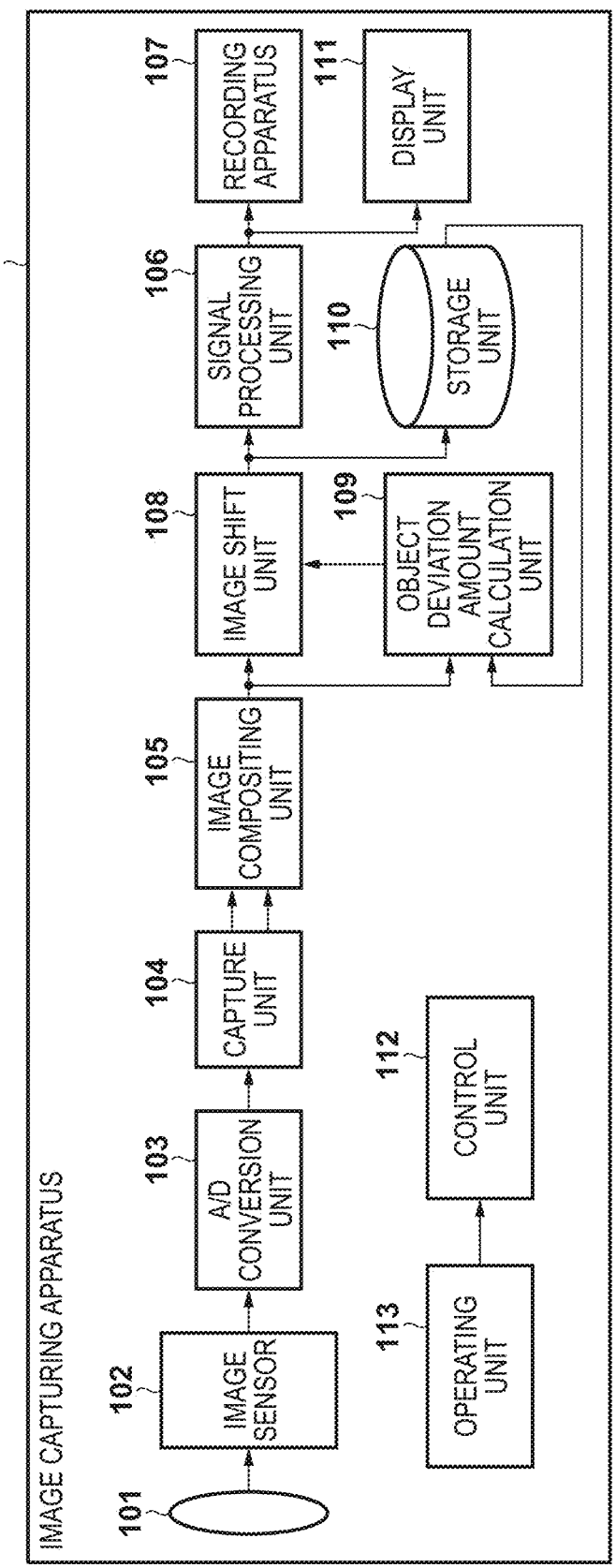
FIG. 1 is a block diagram illustrating the configuration of an image capturing apparatus 100 according to a first embodiment.

FIG. 1 is a block diagram illustrating the configuration of an image capturing apparatus 100, which is an example of an image processing apparatus. An optical system unit 101 is a unit constituted by an optical lens group including a focusing lens for adjusting the focus, a shutter, an aperture stop, a lens control unit, and the like. The optical system unit 101 forms an optical image on an image sensor 102.

The image sensor 102 is an image sensor in which unit pixel cells are arranged in a two-dimensional matrix. An exposure amount of the image sensor 102 is controlled by the shutter included in the optical system unit 101. The image sensor 102 carries out photoelectric conversion on the optical image formed by the optical system unit 101, and outputs charges accumulated in a plurality of photoelectric conversion regions (divided pixels) included in the unit pixel in sequence to an A/D conversion unit 103.

The unit pixel cell in the image sensor 102 will be described here with reference to FIG. 2. In FIG. 2, the unit pixel cell includes 2×1 divided pixels for each microlens included in a microlens array. In other words, a plurality of divided pixels share a single microlens. In the following, the divided pixel on the left side will be called "1A pixel", and the divided pixel on the right side will be called "1B pixel". These unit pixel cells are arranged in a two-dimensional matrix on the image sensor 102 as a Bayer array.

A two-dimensional image formed only by the divided pixels present at the corresponding pixel positions in the microlenses has parallax with respect to a two-dimensional image formed only by the divided pixels present at the other corresponding pixel locations in the microlenses. In FIG. 2, an image formed only by the 1A pixels (called a "1A image" or a "A image pixel group" hereinafter) has parallax with respect to an image formed only by the 1B pixels (called a "1B image" or a "1B image pixel group" hereinafter).

Figure 3C:
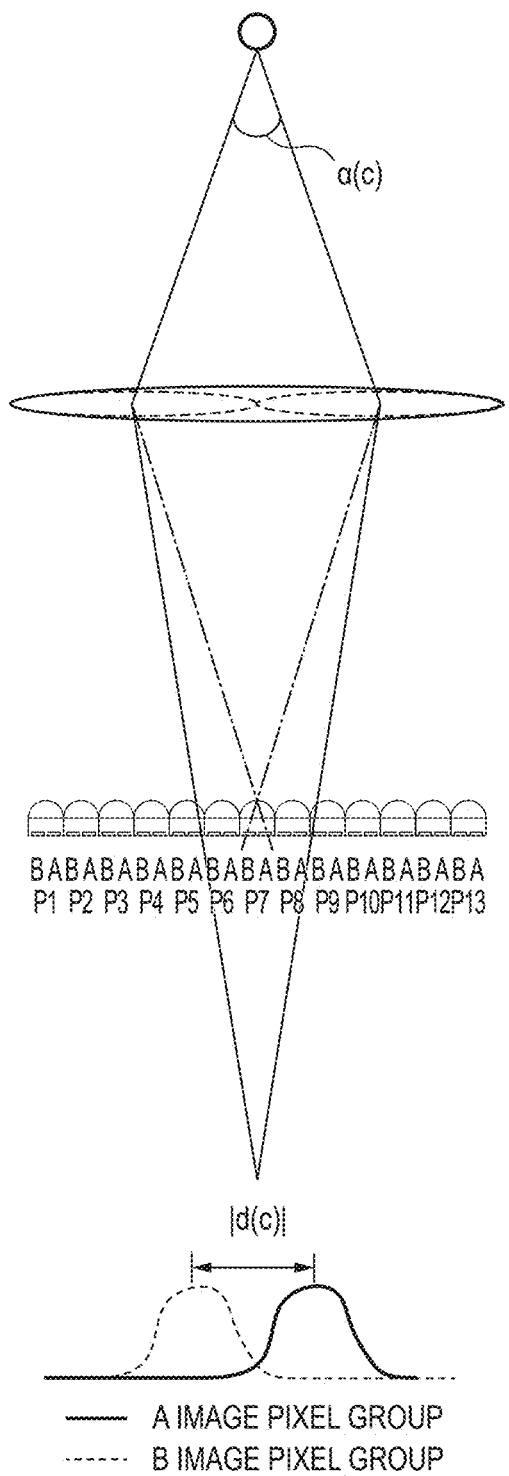

The principles for obtaining parallax images with be described next with reference to FIGS. 3A to 3C. As illustrated in FIGS. 3A to 3C, a plurality of unit pixel cells (unit pixel cells P1 to P13, in the example illustrated in FIGS. 3A to 3C) are arranged in the image sensor 102, each unit pixel cell including the 1A pixel (indicated simply by "A" in FIGS. 3A to 3C) and the 1B pixel (indicated simply by "B" in FIGS. 3A to 3C) disposed separate from each other under a single microlens. Although the unit pixel cells are indicated one-dimensionally in FIGS. 3A to 3C, the unit pixel cells are actually arranged two-dimensionally. The 1A pixels and the 1B pixels are pixels which are pupil-divided with the microlenses serving as exit pupils, and are based on a known technique such as that described in Japanese Patent No. 5917125, for example.

The parallax between the 1A image pixel group and the 1B image pixel group constituted by the 1A pixels and the 1B pixels changes as follows in accordance with the degree of focus.

As illustrated in FIG. 3A, when in an in-focus state, the position where the shooting optical system forms the image corresponds to the position of the unit pixel cell P7, and thus the 1A image pixel group and the 1B image pixel group substantially coincide. At this time, a parallax amount |d(a)| between the 1A image pixel group and the 1B image pixel group, found through a correlation computation, is substantially 0.

As illustrated in FIG. 3B, when in a rear focus state, the position where the shooting optical system forms the image corresponds to the position of the unit pixel cell P5 for the 1A image pixels and the position of the unit pixel cell P9 for the 1B image pixels. At this time, a parallax amount |d(b)| arises between the 1A image pixel group and the 1B image pixel group.

As illustrated in FIG. 3C, when in a front focus state, the position where the shooting optical system forms the image corresponds to the position of the unit pixel cell P9 for the 1A image pixels and the position of the unit pixel cell P5 for the 1B image pixels. At this time, a parallax amount |d(c)| arises between the 1A image pixel group and the 1B image pixel group.

What FIGS. 3A to 3C mean is that when in focus, the 1A image pixel group and the 1B image pixel group see the same object, but during rear focus and front focus, the 1A image pixel group and the 1B image pixel group see objects between which parallax is present.

Returning to FIG. 1, the A/D conversion unit 103 includes a CDS circuit, a nonlinear amplification circuit, and the like for removing noise in the transmission path. The A/D conversion unit 103 uses these circuits to carry out analog signal processing on an analog electrical signal output from the image sensor 102, and then converts the analog electrical signal into a digital electrical signal (a pixel signal) and outputs that signal to a capture unit 104.

The capture unit 104 determines an active period and a type of the pixel signal, and outputs pixel signals corresponding to the 1A pixel and the 1B pixel to an image compositing unit 105.

The image compositing unit 105 composites the 1A image pixel group and the 1B image pixel group. At that time, the image compositing unit 105 controls a change rate per unit of time in the compositing ratio of the 1A image pixel group and the 1B image pixel group based on a viewpoint movement time instructed by a user through an operating unit 113. A moving image to which a viewpoint movement effect has been added (a viewpoint movement moving image) can be generated as a result. For example, by the user setting a moving image shooting time in advance as the viewpoint movement time, a moving image having a viewpoint movement effect only during the set time is generated. When shooting a still image, the viewpoint movement time indicates the period to which the viewpoint movement effect is added in a moving image obtained by compositing parallax images constituting a single still image.

Note that in the viewpoint movement moving image, an object present at the in-focus plane does not have the viewpoint movement effect. However, an object present on the rear focus side and an object present on the front focus side relative to the in-focus plane have viewpoint movement effects shifted in the opposite directions. As such, a rotational center of the viewpoint movement is located at the in-focus plane. The image compositing unit 105 outputs composite images obtained by compositing the 1A image pixel group and the 1B image pixel group (a frame of the viewpoint movement moving image) to an image shift unit 108 and an object deviation amount calculation unit 109.

The image shift unit 108 positions the composite images output from the image compositing unit 105 based on a deviation amount between the composite images output from the object deviation amount calculation unit 109. The positioned composite images are output to a signal processing unit 106 and a storage unit 110.

The storage unit 110 is volatile memory such as DRAM, for example, that temporarily stores the composite images. The stored composite images are used as reference images when calculating a deviation amount between objects in the composite images of the next frame.

The object deviation amount calculation unit 109 detects a deviation amount, produced by compositing between frames, for a pre-set object region, and outputs that deviation amount to the image shift unit 108. The present embodiment assumes that the deviation amount in the object positions caused by the compositing is calculated through a correlation computation such as SAD, SSD, or the like. SAD and SSD are known techniques and will therefore not be described here.

The signal processing unit 106 carries out signal processing such as white balance correction, demosaicing (color interpolation), encoding processing, and the like on the composite images, stores the encoded moving image data in a data file having a predetermined format, and outputs the file to a recording apparatus 107.

The recording apparatus 107 records the data file output from the signal processing unit 106. The recording apparatus 107 may be non-volatile memory built into the image capturing apparatus 100, or may be a memory card that can be attached to/removed from the image capturing apparatus 100. Additionally, the configuration may be such that the data file is sent to an external device through wireless communication or the like.

A control unit 112 includes, for example, a programmable processor such as a CPU, ROM, and RAM, and realizes the functions of the image capturing apparatus 100 by loading programs stored in the ROM into the RAM and executing the programs using the CPU so as to control the operations of the various units.

A display unit 111 is, for example, a color LCD, and is used as a viewfinder, as well as for displaying various types of information of the digital camera, a GUI including menu screens and messages, captured images, and so on.

The operating unit 113 includes input devices such as a power switch, a release button, a menu button, a directional key, an execute key, a mode setting dial, and so on, and is used for the user to enter instructions, settings, and the like to the image capturing apparatus 100.

Note that the object movement effect obtained by compositing the images arises only in the division direction of the divided pixels. For example, when the divided pixels are divided in two in the horizontal direction as indicated in FIG. 2, the viewpoint movement occurs in the horizontal direction. As such, the image deviation direction calculated by the correlation computation can be limited to the division direction.

When the divided pixels have been divided into 2×2, the position of the viewpoint can be defined in two dimensions according to the compositing ratio of each of the divided pixels. In such a case, the image deviation direction calculated through the correlation computation may be limited in the direction of the deviation in the center positions at the compositing ratio of the previous frame and the compositing ratio of the current frame.

Additionally, if the compositing ratio of the divided pixels for compositing undergoes a simple increase or a simple decrease, the image deviation amount has the same sign as the deviation amount seen when comparing the previous frame and two frames previous. For example, if the image deviation amount between the previous frame and two frames previous is +2 pixels, the image deviation amount between the current frame and the previous frame will be a positive value. Conversely, if the image deviation amount between the previous frame and two frames previous is −2 pixels, the image deviation amount between the current frame and the previous frame will be a negative value. As such, the image deviation direction of the correlation computation may be limited with reference to the image deviation direction of the previous frame.

Limiting the image deviation direction in this manner when carrying out the correlation computation makes it possible to greatly reduce the computational load.

Figure 5:
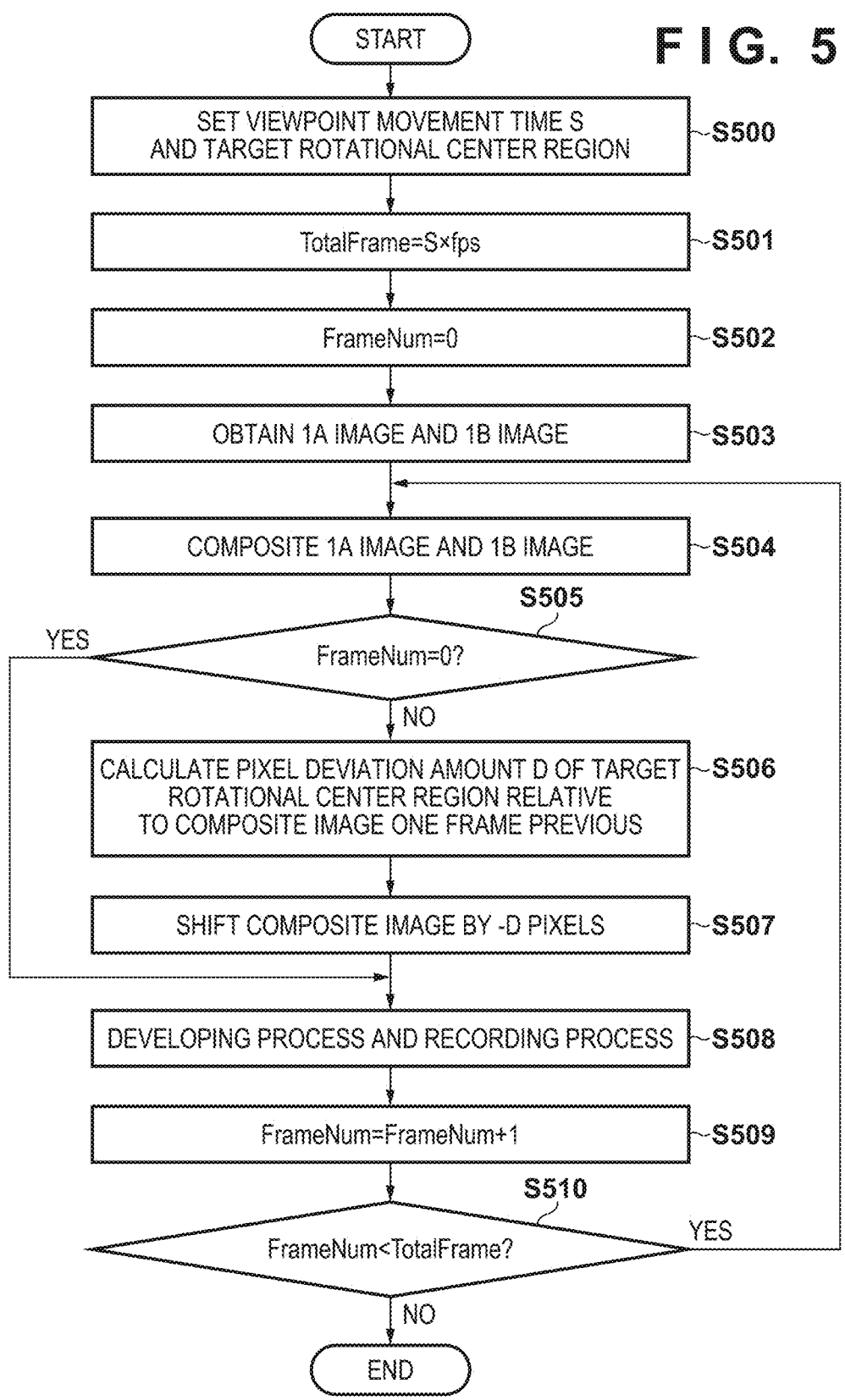
FIG. 5 is a flowchart illustrating a process for generating a viewpoint movement moving image according to the first embodiment.

A process for generating the viewpoint movement moving image will be described in detail next with reference to FIG. 5. Unless otherwise specified, the processes in the respective steps of the flowchart in FIG. 5 are realized by the control unit 112 executing programs.

In step S500, the control unit 112 sets a viewpoint movement time S, and an object region to be taken as the rotational center in the viewpoint movement effect (a target rotational center region), in accordance with user instructions made through the operating unit 113. For example, the user can select an object region to be set as the target rotational center region by using the operating unit 113 to move a cursor displayed superimposed on a live view image in the display unit 111.

In step S501, the control unit 112 calculates a total recorded number of frames TotalFrame by multiplying the viewpoint movement time S by a framerate (fps).

In step S502, the control unit 112 resets a variable FrameNum, which indicates the current frame number, to 0.

In step S503, the control unit 112 obtains the 1A image and the 1B image by controlling the image sensor 102, for example, and inputs those images into the image compositing unit 105.

In step S504, the image compositing unit 105 composites the 1A image and the 1B image. The compositing process is carried out according to the following Equation (1).

$$\text{OUT\_PIX} = \frac{((TotalFrame - 1) - FrameNum) \times A\_PIX + FrameNum \times B\_PIX}{(TotalFrame - 1)} \times 2 \quad (1)$$

Here, A_PIX represents the pixels of the 1A image, B_PIX represents the pixels of the 1B image, and OUT_PIX represents the output pixels.

Here, a change in a contour center positions of the composite images, which are collections of the OUT_PIX obtained from the compositing process indicated by Equation (1), will be described with reference to FIG. 4. FIG. 4 illustrates a state when a given object has been shot, where the horizontal axis represents the pixel position in the horizontal direction and the vertical axis represents the pixel value. The lines of the 1A image and the 1B image represent the input values of the divided pixels at each pixel position, and the other lines indicate the values of composite pixels. The 1A image and the 1B image have an image deviation amount of four pixels, and the pixels obtained by adding 1A:1B at a compositing ratio of 50:50 correspond to a normal image with no pupil division.

As the compositing changes from 50:50 to 45:55, 36:64, 20:80, and to 0:100, the center positions of the composite pixels gradually approach the center positions of the 1B image. Likewise, although not illustrated here, when the compositing ratio of the 1A image is increased, the center positions of the composite pixels approach the center positions of the 1A image.

When generating the viewpoint movement moving image, the image compositing unit 105 carries out control so that the center positions of the composite images move smoothly from the center positions of the 1A image to the center positions of the 1B image, by changing the compositing ratio according to Equation (1) for each frame. Carrying out the compositing process in this manner makes it possible to achieve an effect in which the viewpoint is moving in the composite moving image.

In step S505, the control unit 112 determines whether or not FrameNum is 0, which is a value indicating the first frame. If FrameNum is 0, the process moves to step S508, whereas if FrameNum is 1 or higher, indicating the second or subsequent frame, the process moves to step S506.

In step S506, the object deviation amount calculation unit 109 calculates a pixel deviation amount D of the target rotational center region in the composite image of the current frame relative to the composite image one frame previous. The pixel deviation amount D is calculated through a correlation computation, for example.

In step S507, the image shift unit 108 shifts the composite image by −D pixels based on the pixel deviation amount D. By shifting the composite image by −D pixels in this manner, the viewpoint movement effect in the target rotational center region is canceled, and the viewpoint movement effect is imparted on the object region in the in-focus plane where the viewpoint movement effect is not present.

Thus through the processing in step S507, the rotational center of the viewpoint movement can be moved from the object region located in the in-focus plane to the target rotational center region.

Note that unlike a situation where the rotational center is moved through refocus processing, as in Japanese Patent Laid-Open No. 2017-5689, double contours do not in principle arise through the process of step S507. As such, in the present embodiment, the rotational center of the viewpoint movement can be moved without being restricted by the permissible circle of confusion, the f-stop value of the imaging optical system at the time of shooting, and the number of divided pixels.

In step S508, the signal processing unit 106 carries out a developing process on the composite image and records the result in the recording apparatus 107. White balance correction, synchronizing processing, moving image encoding processing, and the like are included in the developing process.

In step S509, the control unit 112 adds 1 to the variable FrameNum. The frame to be processed moves to the next frame as a result.

In step S510, the control unit 112 determines whether or not FrameNum is less than TotalFrame. If FrameNum is less than TotalFrame, the process returns to step S504, and the same compositing process is carried out for the next frame. In the compositing process for the next frame, the 1A image and the 1B image are composited at a compositing ratio which is set according to Equation (1) and which is different from that used for the current frame. In this manner, carrying out the same processing from FrameNum=0 until FrameNum=(TotalFrame−1) makes it possible to generate a viewpoint movement moving image in which the number of frames is TotalFrame. The processing of this flowchart ends when FrameNum becomes equal to TotalFrame.

According to the first embodiment as described thus far, a plurality of composite images are generated by repeating the compositing process for compositing a plurality of parallax images, each of which has parallax with respect to another, according to a compositing ratio (steps S504 to S510 in FIG. 5). In the compositing process which is carried out repeatedly, the image compositing unit 105 carries out control so that the compositing ratio changes over time, in accordance with Equation (1). A viewpoint movement effect is produced among the plurality of composite images due to the compositing ratio changing over time. If the processes of steps S506 and S507 are not carried out, the rotational center of the viewpoint movement is the in-focus plane of the parallax images. However, by carrying out the processes of steps S506 and S507, the plurality of composite images are positioned so that the position of an object in the target rotational center region (a specific object) is the same among the plurality of composite images. As a result, the rotational center of the viewpoint movement moves in the depth direction (the focus direction), and a viewpoint movement moving image is obtained in which the target rotational center region is the rotational center of the viewpoint movement. Thus according to the first embodiment, it is possible to generate, from parallax images, a moving image having a viewpoint movement effect in which a position different from the in-focus plane in the depth direction serves as a rotational center.

Although the present embodiment describes an object region selected by the user in step S500 as the target rotational center region, the method for setting the target rotational center region is not limited thereto. For example, the control unit 112 may set an object region furthest from the object region selected by the user with respect to the focus direction (the depth direction of the shot image) as the target rotational center region. As a result, a comparatively large viewpoint movement effect can be imparted on the object region selected by the user.

Additionally, the present embodiment describes a configuration in which a plurality of parallax images (the 1A image and the 1B image) generated from a single instance of shooting by the image sensor 102 are repeatedly used as the plurality of parallax images to be composited in the compositing process which is repeatedly carried out. However, a configuration may be employed in which a plurality of parallax images generated sequentially by continuous shooting using the image sensor 102 may be used sequentially. For example, the image capturing apparatus 100 takes a number of continuous shots corresponding to TotalFrame, calculated in step S501. Then, the image capturing apparatus 100 sequentially uses the plurality of parallax images which have been repeatedly generated, in the process of step S504 that is executed repeatedly.

Second Embodiment

The first embodiment described a configuration in which a pixel shift is carried out based on a deviation amount of an object between the composite image of the previous frame and the composite image of the current frame in order to move the rotational center of the viewpoint movement in the focus direction (the depth direction). However, it may not be possible to calculate the deviation amount correctly if the object in the target rotational center region has a low contrast. This is because when there are only slight changes in the center positions of the contours in the composite images between frames, there will be a higher level of variation when estimating the extreme values for the correlation computation results.

Accordingly, the second embodiment will describe a configuration in which the deviation amount of an object between composite images is obtained based on the deviation amount (parallax amount) of the object between parallax images.

Figure 6:
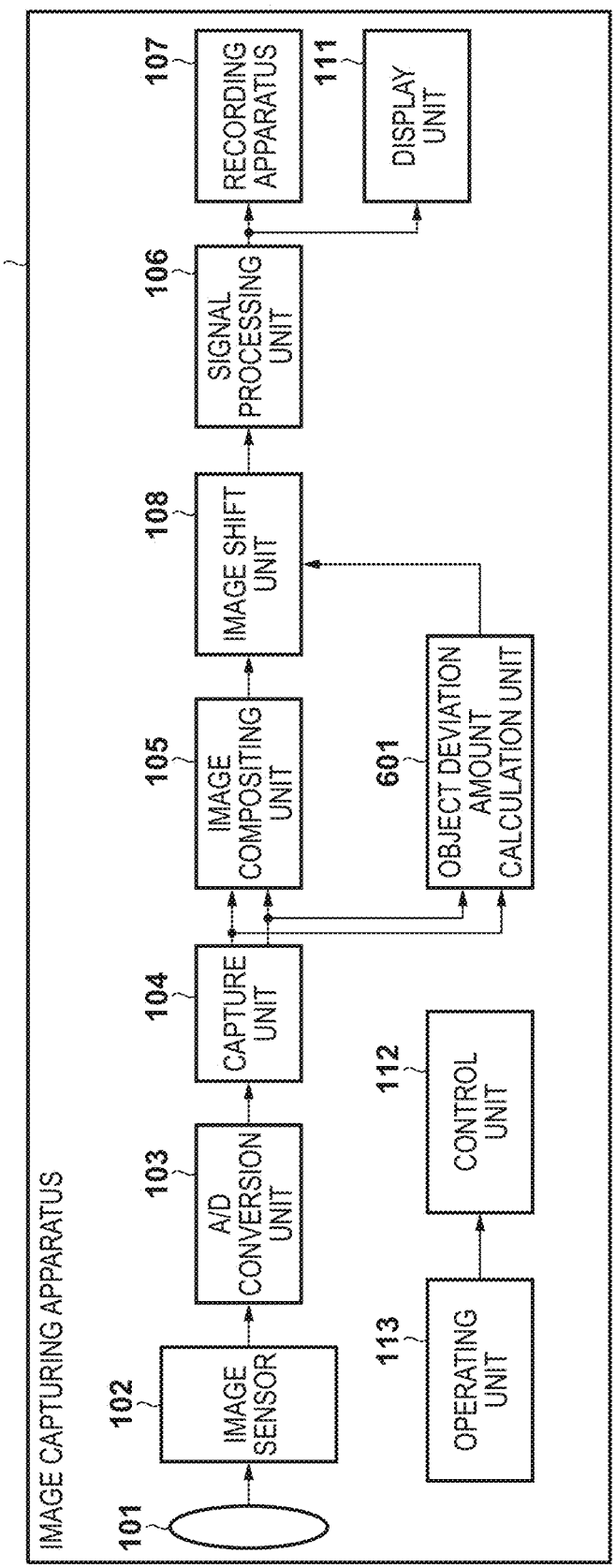
FIG. 6 is a block diagram illustrating the configuration of an image capturing apparatus 600 according to a second embodiment.

FIG. 6 is a block diagram illustrating the configuration of an image capturing apparatus 600 according to the second embodiment. The image capturing apparatus 600 differs from the image capturing apparatus 100 (FIG. 1) in that the storage unit 110 is not included and the object deviation amount calculation unit 109 has been replaced with an object deviation amount calculation unit 601.

The capture unit 104 determines an active period and a type of the pixel signal, and outputs pixel signals corresponding to the 1A pixel and the 1B pixel to the image compositing unit 105 and the object deviation amount calculation unit 601.

The object deviation amount calculation unit 601 calculates a deviation amount D of an object between the 1A image and the 1B image, for the target rotational center region set in accordance with a user operation made through the operating unit 113. The deviation amount D expresses an overall deviation amount produced by changing the compositing ratio of the 1A image and the 1B image. In other words, the highest value is calculated for the deviation amount produced by the compositing, and thus calculation error for the deviation amount can be made relatively low, even for objects with low contrast.

Consider a case where, like the first embodiment, the compositing ratio of the 1A image and the 1B image changes over time in accordance with Equation (1). In this case, a deviation amount d of the object produced by viewpoint between the composite images can be estimated (calculated) according to the following Equation (2), which uses the deviation amount D of the object between the parallax images.

$$d = D \times \text{FrameNum}/(\text{TotalFrame}-1) \quad (2)$$

The image shift unit 108 shifts the composite image by $-d$ pixels based on the deviation amount d of the object produced by the viewpoint movement between the frames (between the composite images) found per frame according to Equation (2).

Figure 7:
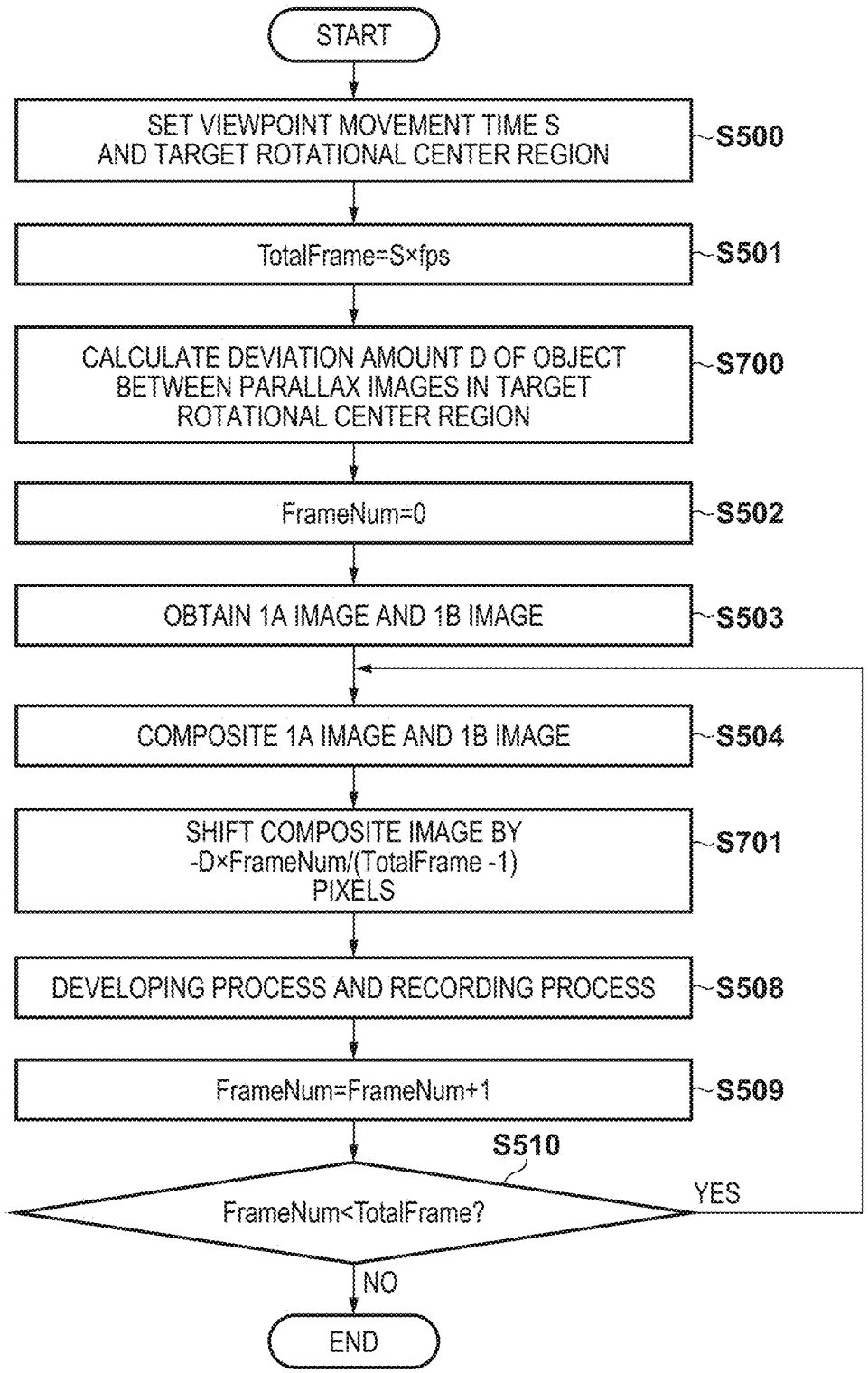
FIG. 7 is a flowchart illustrating a process for generating a viewpoint movement moving image according to the second embodiment.

A process for generating the viewpoint movement moving image will be described in detail next with reference to FIG. 7. Unless otherwise specified, the processes in the respective steps of the flowchart in FIG. 7 are realized by the control unit 112 executing programs.

In step S700, the object deviation amount calculation unit 601 calculates the deviation amount D for the object region, between the parallax images in the target rotational center region. The deviation amount D is calculated through a correlation computation, for example.

In step S701, the object deviation amount calculation unit 601 calculates the deviation amount d of the object between the composite image in the current frame and the composite image in the first frame, according to Equation (2), and outputs the result to the image shift unit 108. The image shift unit 108 then shifts the composite images by $-d$ pixels. Through this processing, positional deviation between the plurality of composite images, produced by the compositing ratio changing over time, can be reduced. This positional deviation corresponds to the parallax amount of the object between the plurality of parallax images (the specific object) in the target rotational center region. Thus by reducing this positional deviation, the rotational center of the viewpoint movement moving image can be moved close to the target rotational center region. The amount of the positional deviation is identified based on the changes over time in the parallax amount and the compositing ratio, according to Equation (2).

If the center position of the composite image on which the viewpoint movement effect has been imparted is moved from 100% at the position of the 1A image to 100% at the position of the 1B image, the deviation amount d of the object in the composite image in each frame can be estimated based on the deviation amount D of the object between the parallax images, through the foregoing processing. This processing is effective on objects having low contrast. Additionally, the correlation computation is not carried out on each frame, and thus a drop in image quality caused by the deviation amount being erroneously detected in a specific frame or the like can be suppressed. Furthermore, correlation computations are generally known to have a high computational cost. The computational cost can therefore be reduced by carrying out a correlation computation only once in order to calculate the deviation mount D of the object between the parallax images, and then estimating the deviation amount for each frame using Equation (2).

According to the second embodiment as described thus far, the image capturing apparatus 600 obtains the deviation amount of an object between composite images based on a deviation amount (parallax amount) of the object between parallax images in a target rotational center region. The deviation amount for the object between the composite images can therefore be obtained even when the object in the target rotational center region has a low contrast.

Although the present embodiment describes a case where the compositing ratio changes uniformly according to Equation (1) (i.e., the ratio of the 1B image increases linearly), the present embodiment can also be applied in a case where the compositing ratio changes in another manner. In this case, the deviation amount of the object between the composite images can be estimated by varying Equation (2) as appropriate in accordance with the manner in which the compositing ratio changes.

Furthermore, in a moving image, if the object moves in the focus direction, there are cases where the rotational center follows the object and the quality of the moving image drops as a result. In such a case, setting the deviation amount of the object in all of the frames based on the deviation amount of the object for the 1A image and the 1B image in the first frame makes it possible to impart a viewpoint movement effect that is independent from movement of the object in the focus direction.

Third Embodiment

The first embodiment described a configuration in which an object region selected by the user is set as the target rotational center region. In this case, a region in which an object is not present cannot be set as the target rotational center region.

Accordingly, the third embodiment will describe a configuration in which the rotational center of the viewpoint movement is moved in the depth direction based on an amount of defocus from the in-focus plane (in-focus distance).

Figure 8:
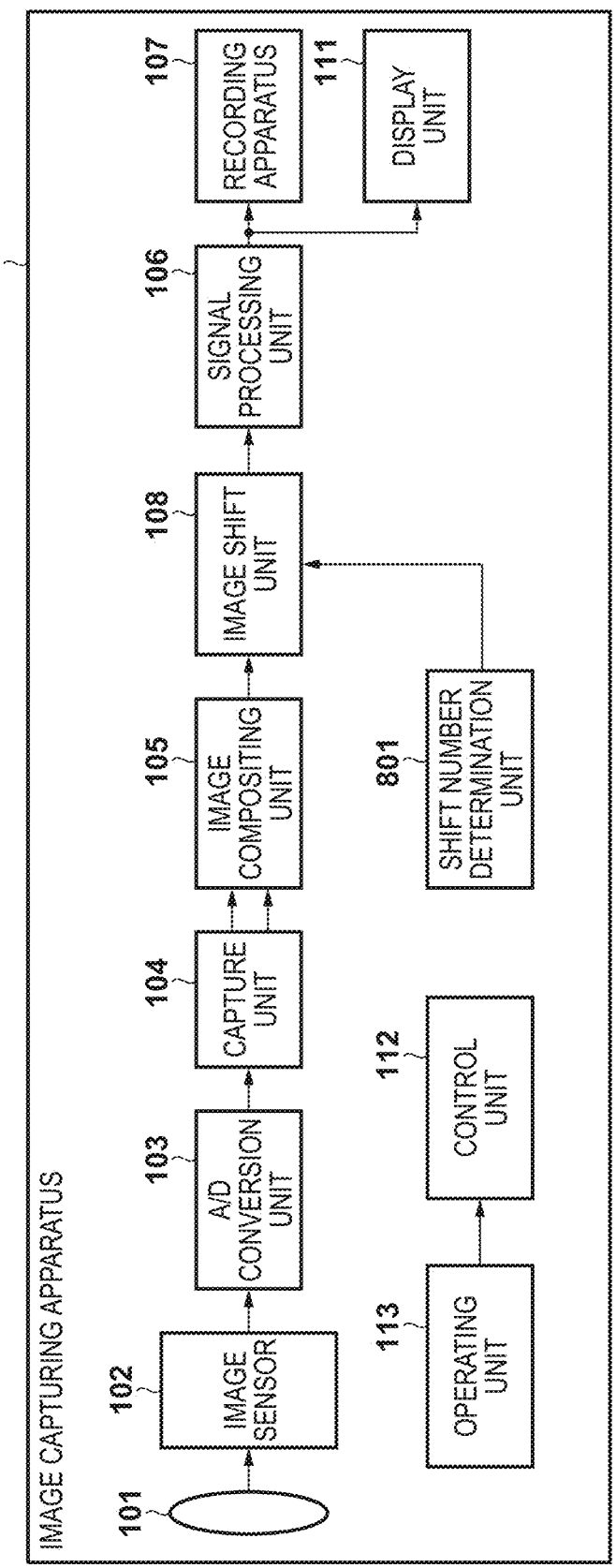
FIG. 8 is a block diagram illustrating the configuration of an image capturing apparatus 800 according to a third embodiment.

FIG. 8 is a block diagram illustrating the configuration of an image capturing apparatus 800 according to the third embodiment. The image capturing apparatus 800 differs from the image capturing apparatus 100 (FIG. 1) in that the storage unit 110 is not included and the object deviation amount calculation unit 109 has been replaced with a shift number determination unit 801.

Based on a defocus amount def set in accordance with user instructions made through the operating unit 113, the shift number determination unit 801 obtains a parallax amount D between parallax images at a target rotational center distance in the depth direction (a distance corresponding to the sum of the in-focus distance and the defocus amount). The parallax amount D can be calculated according to Equation (3).

$$D = def/K \quad (3)$$

Here, K is a value determined based on the optical characteristics of the image sensor 102, the optical system unit 101, and so on. In a typical focus detection apparatus, the defocus amount can be calculated by multiplying the image deviation amount, obtained through a correlation computation between divided pixels, by K. The image deviation amount, i.e., the parallax amount D, can therefore be calculated by dividing the defocus amount by K, as per Equation (3).

The parallax amount D corresponds to the deviation amount of an object between the parallax images at the target rotational center distance. Accordingly, the parallax amount D is substantially the same as the deviation amount D of the object between the parallax images according to the second embodiment. The deviation amount d of the object between the composite images can therefore be calculated from the parallax amount D (the deviation amount D) according to Equation (2), in the same manner as in the second embodiment. The shift number determination unit 801 outputs the calculated deviation amount d to the image shift unit 108.

Figure 9:
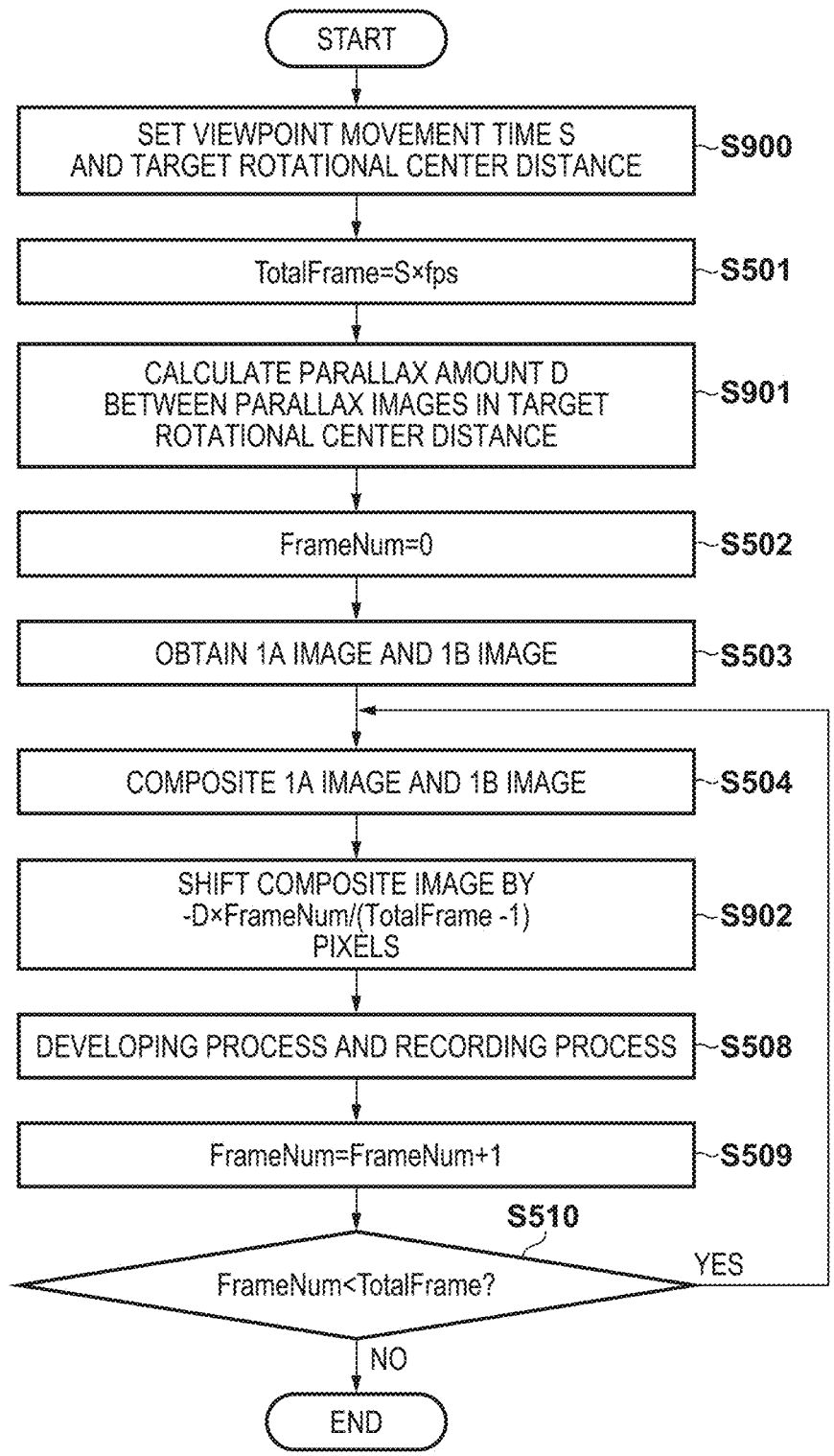
FIG. 9 is a flowchart illustrating a process for generating a viewpoint movement moving image according to the third embodiment.

A process for generating the viewpoint movement moving image will be described in detail next with reference to FIG. 9. Unless otherwise specified, the processes in the respective steps of the flowchart in FIG. 9 are realized by the control unit 112 executing programs.

In step S900, the control unit 112 sets the viewpoint movement time S, and an in-focus distance to be taken as the rotational center in the viewpoint movement effect (the target rotational center distance), in accordance with user instructions made through the operating unit 113. For example, the user can input a defocus amount using the operating unit 113, and the control unit 112 can calculate the target rotational center distance by adding the defocus amount to the current in-focus distance.

In step S901, the shift number determination unit 801 calculates the parallax amount D between the parallax images (the deviation amount D) according to Equation (3).

In step S902, the shift number determination unit 801 calculates the deviation amount d of the object between the composite image in the current frame and the composite image in the first frame, according to Equation (2), and outputs the result to the image shift unit 108. The image shift unit 108 then shifts the composite images by −d pixels. Through this processing, positional deviation between the plurality of composite images, produced by the compositing ratio changing over time, can be reduced. This positional deviation corresponds to the parallax amount between the plurality of parallax images at the target rotational center distance. Thus by reducing this positional deviation, the rotational center of the viewpoint movement moving image can be moved close to the target rotational center distance. Note that the parallax amount is identified based on a difference between the target rotational center distance (a specific distance) and the in-focus distance of the plurality of parallax images (i.e., the defocus amount), according to Equation (3).

According to the third embodiment as described thus far, the image capturing apparatus 800 moves the rotational center of the viewpoint movement in the depth direction based on the amount of defocus from the in-focus plane (the in-focus distance). This makes it possible to set the rotational center of the viewpoint movement at a distance where no object is present.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-022945, filed Feb. 12, 2019 which is hereby incorporated by reference herein in its entirety.

What is claimed is:

1. An image processing apparatus comprising at least one processor and/or at least one circuit which functions as:
   an obtaining unit configured to obtain a plurality of parallax images for each frame;
   a generating unit configured to generate a plurality of composite images by repeatedly carrying out, for each frame of the plurality of parallax images, a compositing process that composites the plurality of parallax images according to a compositing ratio, the parallax images having parallax with respect to each other, and to generate a viewpoint movement moving image from the plurality of composite images;
   a control unit configured to carry out control so that the compositing ratio changes for each frame of the plurality of parallax images obtained; and
   a positioning unit configured to position the plurality of composite images so that a rotational center of viewpoint movement arising between the plurality of composite images due to the change in the compositing ratio for each frame of the plurality of parallax images obtained moves in a depth direction.

2. The image processing apparatus according to claim 1, wherein the positioning unit positions the plurality of composite images so that a position of a specific object coincides between the plurality of composite images.

3. The image processing apparatus according to claim 1, wherein the positioning unit positions the plurality of composite images so as to reduce positional deviation between the plurality of composite images arising due to the change in the compositing ratio for each frame of the plurality of parallax images obtained, the positional deviation between the plurality of composite images corresponding to a parallax amount of a specific object between the plurality of parallax images.

4. The image processing apparatus according to claim 3, wherein the positioning unit identifies an amount of the positional deviation between the plurality of composite images based on the parallax amount and the change in the compositing ratio for each frame of the plurality of parallax images obtained.

5. The image processing apparatus according to claim 2, wherein the at least one processor and/or at least one circuit further functions as:
   a determining unit configured to determine the specific object in accordance with an instruction from a user.

6. The image processing apparatus according to claim 1, wherein the positioning unit positions the plurality of composite images so as to reduce positional deviation between the plurality of composite images arising due to the change in the compositing ratio for each frame of the plurality of parallax images obtained, the positional deviation between the plurality of composite images corresponding to a parallax amount between the plurality of parallax images at a specific distance in the depth direction, and
   the positioning unit identifies the parallax amount based on a difference between the specific distance and an in-focus distance of the plurality of parallax images.

7. The image processing apparatus according to claim 6, wherein the at least one processor and/or at least one circuit further functions as: a determining unit configured to determine the specific distance in accordance with an instruction from a user.

8. The image processing apparatus according to claim 1, wherein as the plurality of parallax images composited in the compositing process carried out repeatedly, the generating unit sequentially uses the plurality of parallax images generated sequentially by continuous shooting using an image sensor in which unit pixels are arranged two-dimensionally, each unit pixel having a plurality of divided pixels that share a microlens.

9. An image capturing apparatus comprising:
the image processing apparatus according to claim 8; and
the image sensor.

10. An image processing method executed by an image processing apparatus, comprising:
   obtaining a plurality of parallax images for each frame;
   generating a plurality of composite images by repeatedly carrying out, for each frame of the plurality of parallax images, a compositing process that composites the plurality of parallax images according to a compositing ratio, the parallax images having parallax with respect to each other;
   generating a viewpoint movement moving image from the plurality of composite images;
   carrying out control so that the compositing ratio changes for each frame of the plurality of parallax images obtained; and
   positioning the plurality of composite images so that a rotational center of viewpoint movement arising between the plurality of composite images due to the change in the compositing ratio for each frame of the plurality of parallax images obtained moves in a depth direction.

11. A non-transitory computer-readable storage medium which stores a program for causing a computer to execute an image processing method comprising:
   obtaining a plurality of parallax images for each frame;
   generating a plurality of composite images by repeatedly carrying out, for each frame of the plurality of parallax images, a compositing process that composites the plurality of parallax images according to a compositing ratio, the parallax images having parallax with respect to each other;
   generating a viewpoint movement moving image from the plurality of composite images;
   carrying out control so that the compositing ratio changes for each frame of the plurality of parallax images obtained; and
   positioning the plurality of composite images so that a rotational center of viewpoint movement arising between the plurality of composite images due to the change in the compositing ratio for each frame of the plurality of parallax images obtained moves in a depth direction.

\* \* \* \* \*